(12) United States Patent
Hakkinen

(10) Patent No.: US 7,229,174 B2
(45) Date of Patent: Jun. 12, 2007

(54) METHOD TO DETECT MISALIGNMENT AND DISTORTION IN NEAR-EYE DISPLAYS

(75) Inventor: Jukka Hakkinen, Helsinki (FI)

(73) Assignee: Nokia Corporation, Espoo (FI)

( * ) Notice: Subject to any disclaimer, the term of this patent is extended or adjusted under 35 U.S.C. 154(b) by 550 days.

(21) Appl. No.: 10/403,806

(22) Filed: Mar. 28, 2003

(65) Prior Publication Data

US 2003/0184860 A1     Oct. 2, 2003

Related U.S. Application Data

(60) Provisional application No. 60/368,627, filed on Mar. 28, 2002.

(51) Int. Cl.
*A61B 3/10* (2006.01)
(52) U.S. Cl. ............... 351/204; 351/201; 351/240
(58) Field of Classification Search ............... 351/204, 351/201, 240, 221, 200, 239; 359/462; 345/7–9; 348/42, 51–55; 349/15
See application file for complete search history.

(56) References Cited

U.S. PATENT DOCUMENTS

| 5,034,809 A | | 7/1991 | Katoh | 358/88 |
| 5,612,709 A | | 3/1997 | Sudo et al. | 345/8 |
| 5,625,408 A | | 4/1997 | Matsugu et al. | 348/42 |
| 5,825,340 A | * | 10/1998 | Torizuka et al. | 345/8 |
| 5,936,663 A | | 8/1999 | Tabata et al. | 348/51 |
| 6,239,771 B1 | * | 5/2001 | Usuki et al. | 345/8 |

* cited by examiner

*Primary Examiner*—Huy Mai
(74) *Attorney, Agent, or Firm*—Ware, Fressola, Van Der Sluys & Adolphson LLP

(57) ABSTRACT

A flashing dot is alternately shown in the left image and right display of a binocular device at short intervals so as to allow a user to detect the misalignment in the displays. If misalignment occurs, the user sees a dot moving between two locations. The user uses a device or a software program to move the dot for minimizing the apparent movement until a single stationary dot is observed.

8 Claims, 7 Drawing Sheets

IOD>IPD

IOD<IPD

PRENTICE'S RULE:
PRISMATIC EFFECT=e[cm]/F[meters]

LEFT DISPLAY    RIGHT DISPLAY

PERCEPTION

LEFT DISPLAY    RIGHT DISPLAY

PERCEPTION

METHOD TO DETECT MISALIGNMENT AND DISTORTION IN NEAR-EYE DISPLAYS

This application is based on and claims priority of U.S. Provisional application No. 60/368,627, filed Mar. 28, 2002.

FIELD OF THE INVENTION

The present invention relates to a binocular device and, more specifically, to a binocular near-eye display.

BACKGROUND OF THE INVENTION

If a binocular or biocular HMD (head-mounted display or helmet-mounted display) is well constructed and aligned, only one scene is perceived and viewing is comfortable. However, all binocular instruments have slight differences between the two images. The differences in image geometry may have many different causes. One possibility is that the HMD does not fit well and for this reason the displays are not directly in front of the left and right eyes. This means that the eyes are forced to align themselves in an unnatural way, which may cause eyestrain or other severe symptoms. For example, if the interocular distance (IOD) is larger than the interpupillary distance (IPD), the eyes have to turn toward the temples, as shown in FIG. 1a. This would cause eyestrain. Similarly, if one display is positioned higher than the other, the eyes have to look at different vertical levels. This eye movement also strains the muscular systems that support the movements. Misalignment in optical components relative to the eyes can cause image distortion. For example, prismatic effects may occur because of a certain misalignment, as shown in FIG. 2. Optical effects such as towel distortion, rotations, translations and so forth may cause further eyestrains in difficulties in perceiving the image.

Small misalignment or distortions is unnoticeable and may be tolerable, but when misalignment or distortion increases, extended use can cause severe headache. Very large differences between left and right images can cause eyestrain, nausea and headache. The scene will occasionally split into two images or mis-registered images, causing double vision (diplopia). It is also possible that one image is suppressed.

To detect the different types of misalignment, several solutions have been suggested. As shown in FIGS. 3b, 3c and 3d, lines and boxes in the right and left images are used to align the images. Aligning lines or boxes have some disadvantages. These methods can only detect global misalignment. They are unable to detect local differences or complex distortions. In principle, local differences and more complex distortions can be detected by using smaller boxes in smaller versions of alignment procedure. In practice, localized alignments based on local differences are not useful because the visual system is not sensitive enough for such procedures. Furthermore, the alignment-based procedure can make measurements in one direction at a time. For example, it cannot make measurements in both horizontal and vertical directions at the same time. This restriction has two consequences: 1) an assumption about the direction of the misalignment must be made prior to the measurements, and 2) a separate testing sequence is required for each direction if multiple misalignment measurements are desired. This method is not flexible and also time-consuming.

It is thus advantageous and desirable to provide a method and system for detecting local misalignment or complex distortion in a faster and more sensitive, and processes for correcting the misalignments based on the detection.

SUMMARY OF THE INVENTION

It is a primary object of the present invention to provide a method and system for correcting the misalignments in a binocular device so as to reduce adverse symptoms due to the misalignments.

In particular, the present invention provides a number of processes to measure misalignments or distortions in binocular HMDs.

Thus, according to the first aspect of the present invention, there is provided a method for aligning a binocular device having a first display and a second display to display an image, the device allowing a user to see the image on the first display with the user's left eye and the image on the second display with the user's right eye. The method comprises the steps of:

alternately providing a flashing dot at a position in the first display and a corresponding position in the second display at predetermined intervals for producing a first image of the dot in the user's left eye and a second image of the dot in the user's right eye; and adjusting at least one of the displays relative to the user's eyes until the first image and the second image appear to substantially coincide with each other.

The adjusting is carried out by the user using a movement device, but it can also be carried out by a software program, or by a hardware component operatively connected to the binocular device.

According to the second aspect of the present invention, there is provided a system for aligning a binocular device having a first display and a second display to display an image, the device allowing a user to see the image on the first display with the user's left eye and the image on the second display with the user's right eye. The system comprises:

means for alternately providing a flashing dot at a position in the first display and a corresponding position in the second display a predetermined intervals to produce a first image of the dot in the user's left eye and a second image of the dot in the user's right eye; and means, operatively connected to at least one of the displays, for adjusting said at least one of the displays relative to the user's eyes until the first image and the second image appear to coincide with each other.

The adjusting means is controllable by the user, or by a software program.

The present invention will become apparent upon reading the description taken in conjunction with FIGS. 4 to 6b.

BEST MODE TO CARRY OUT THE INVENTION

The invention is based on three processes of the visual system.

1. Apparent movement means that if two dots are alternately flashed in a sufficient frequency and from some distance apart, there appears an illusion of movement between these two dots. For example television and movies are based on this illusion: although the broadcast or show consists of separate static frames, they are perceived as a smooth movement because they are shown fast enough sequence.

2. Interocular apparent movement means that you can show the dots or frames alternately to left and right eye and still see the illusion of movement.

3. Stereoscopic fusion means that the visual system has to fuse the images relayed from left and right eye to form a single three-dimensional perception of world that we usually experience. The fusion is possible even if the images are highly artificial, as in a HMD. Although the fusion is achieved in the case of the HMD, the eye muscles have to work hard to maintain the fusion. If the HMD is misaligned or if there are prismatic distortions, the workload for the eye muscles is even higher. Interocular apparent movement can be used to detect how much the eyes have to work to achieve fusion and also to measure the causes of this strain.

Figure 1A:
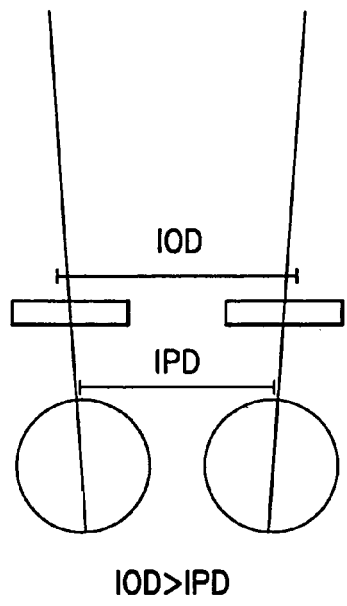
FIG. 1a is a schematic representation showing the eye movement for correcting the misalignment where the interocular distance is larger than the interpupillary distance.
Figure 1B:
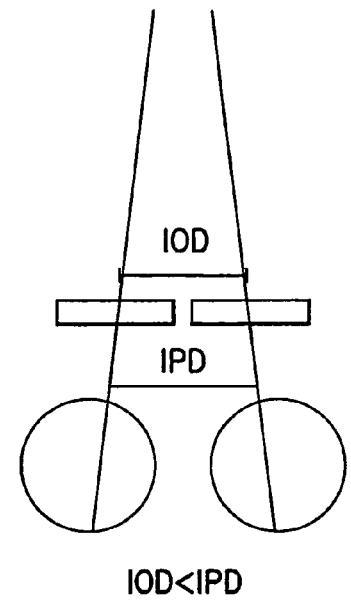
FIG. 1b is a schematic representation showing the eye movement for correcting the misalignment where the interocular distance is smaller than the interpupillary distance.
Figure 2:
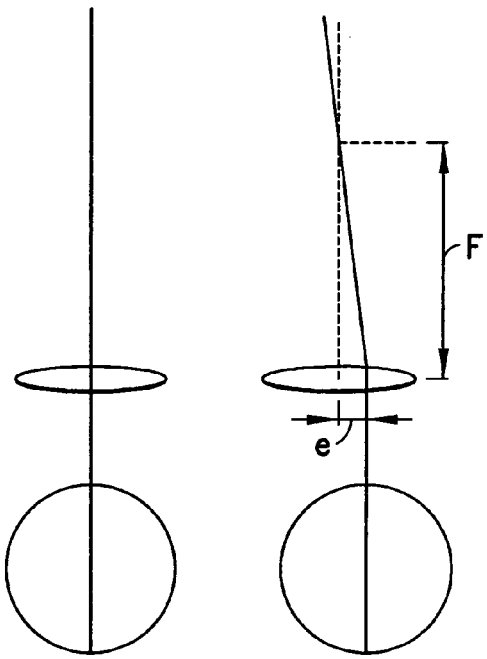
FIG. 2 is a schematic representation showing an prismatic effect due to misalignment in optical components in a binocular device.
Figure 3A:
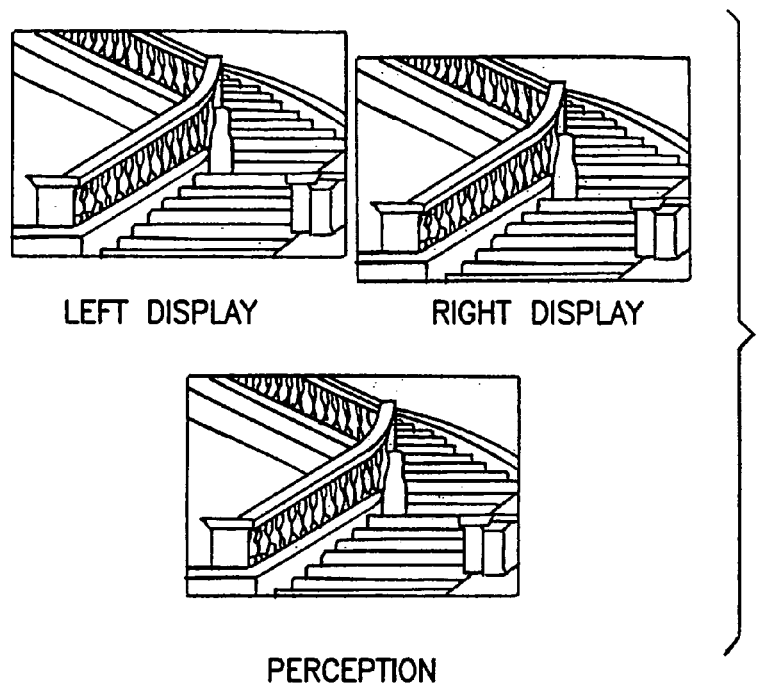
FIG. 3a is a schematic representation showing the ability of the eyes in fusing two misaligned images in two displays of a HMD into a single percept.
Figure 3B:
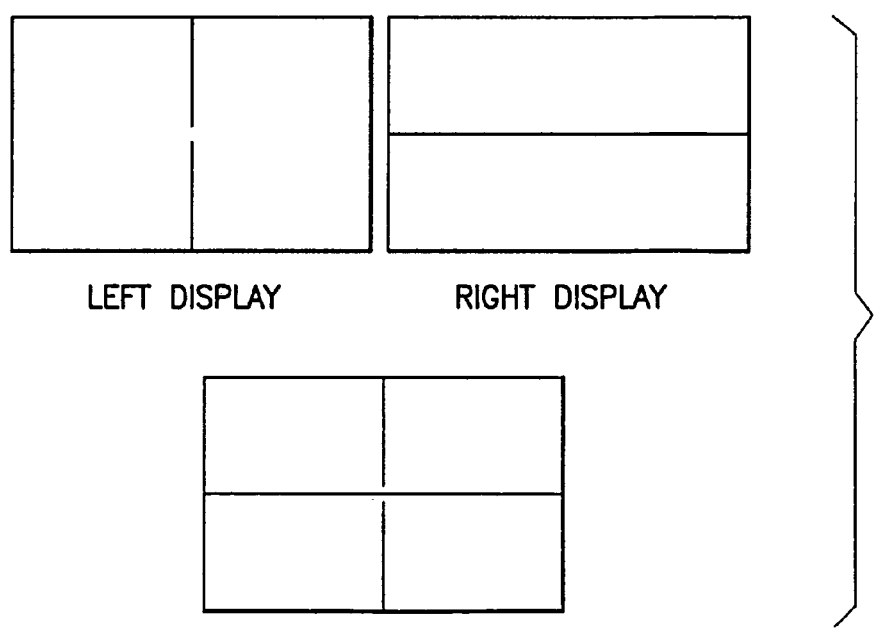
FIGS. 3b to 3d are schematic representations showing prior art methods using boxes and lines to detect global misalignments.
Figure 3C:
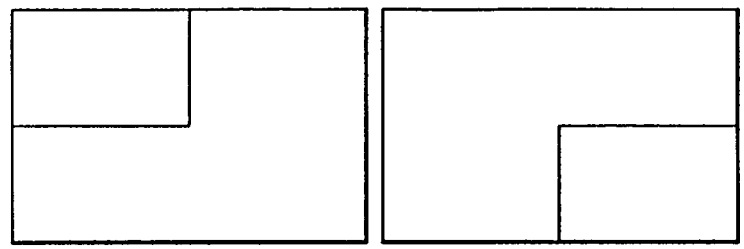
Figure 3C:
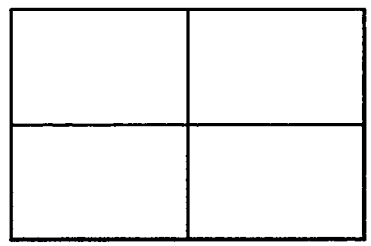
Figure 3D:
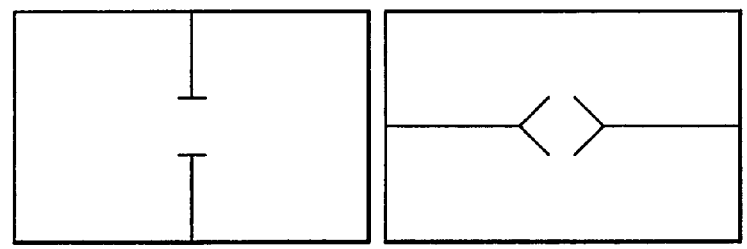
Figure 3D:
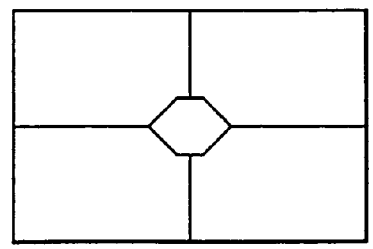
Figure 4:
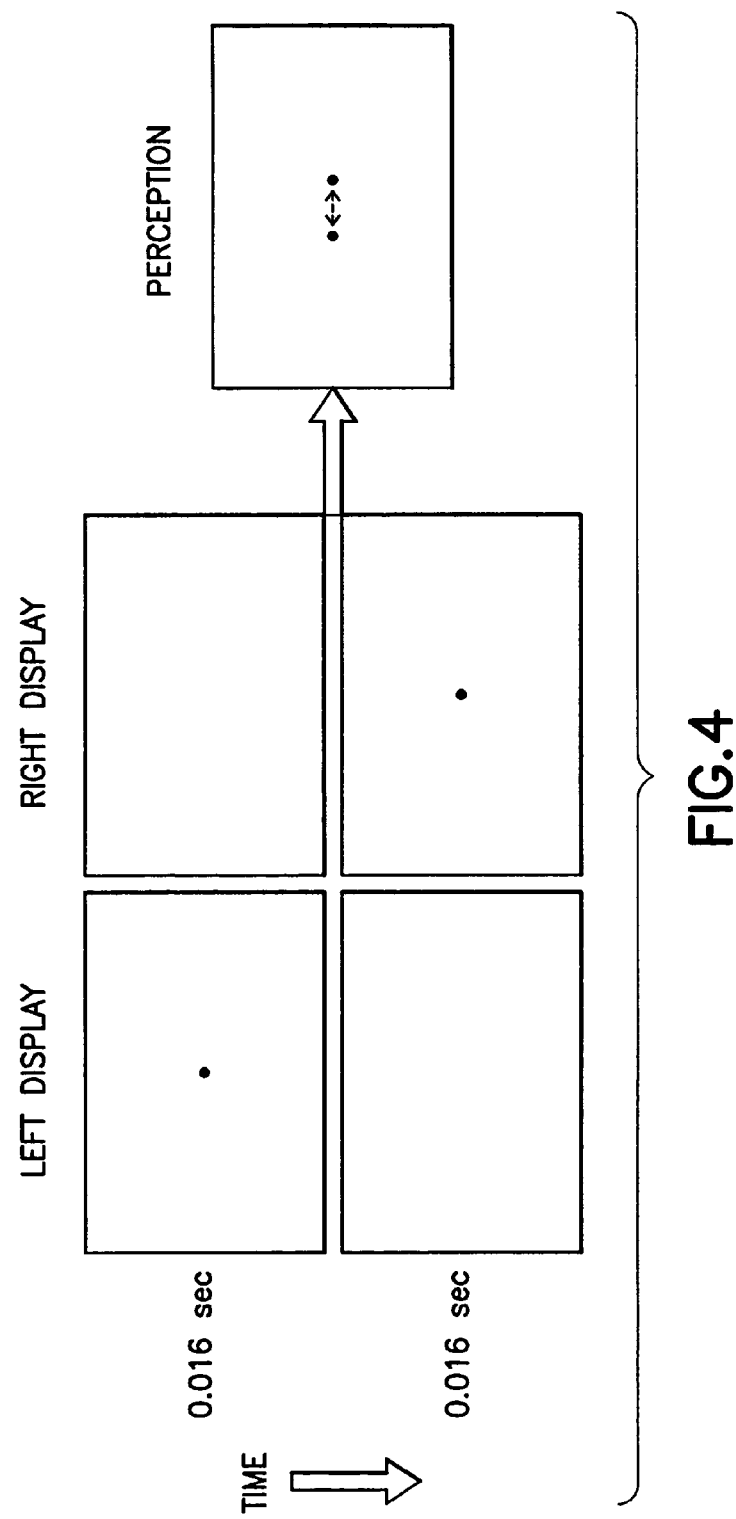
FIG. 4 is a schematic representation showing the interocular apparent movement caused by flashing dots, according to the present invention.
Figure 5:
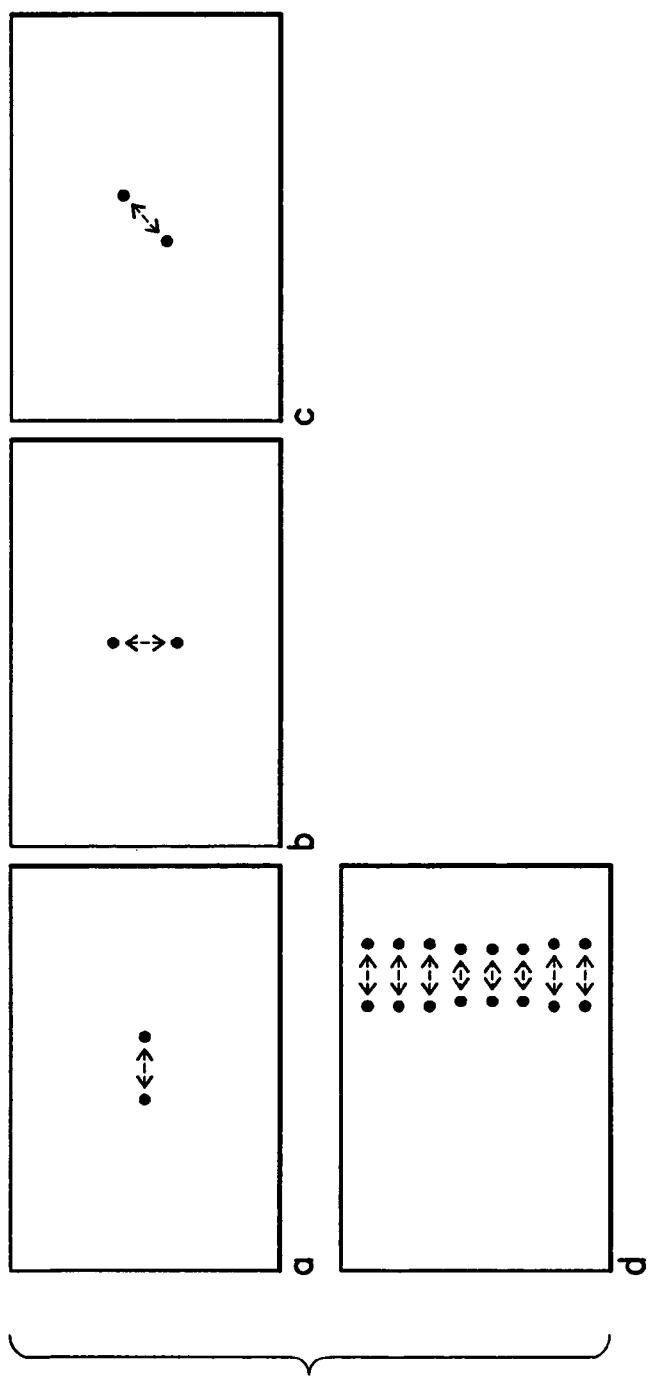
FIG. 5a is a schematic representation showing interocular apparent movement caused by flashing dots between two horizontal positions.
FIG. 5b is a schematic representation showing interocular apparent movement caused by flashing dots between two vertical positions.
FIG. 5c is a schematic representation showing interocular apparent movement caused by flashing dots between two oblique positions.
FIG. 5d is a schematic representation showing a sequence of flashing dots for measuring the interocular apparent movement in a number of different positions, according to the present invention.

If interocular apparent movement is used to detect misalignment and distortions, the observer is shown a dot flashing alternately in the left and right eye at a frequency of 0.63 Hz (FIG. 4). The observer sees a single dot that is moving between two locations if horizontal misalignment between two displays occurs, as shown in FIG. 4 and FIG. 5a. If the displays are aligned, the observer only sees a single stationary flashing dot. Likewise, if vertical misalignment occurs between two displays, the observer sees a single dot that is moving between two vertical positions, as shown in FIG. 5b. If both vertical and horizontal misalignment occur, the observer sees a single dot that is moving between oblique positions as shown in FIG. 5c. When two dots are observed, the task of the user is to move one of the dots with a tracking device such as a mouse or joystick to minimize the apparent movement. When the user no longer sees movement and sees only a single flashing dot, the procedure is over. The direction and distance the dot was moved by the user describes the magnitude of misalignment. This procedure has a number of possible applications:

1. A simple and fast misalignment procedure for HMDs. After putting a HMD on the user goes through a quick calibration procedure that detects the misalignment of the HMD. If the misalignment is large enough the system warns the user and suggests that the HMD should be repositioned for optimal and comfortable use.

2a. Input for adaptive HMD. A HMD can have adaptive components that change the position of the left and right display either with software or with hardware. Interocular flash method could be used as input for such a procedure. The user would perform in the flash task after which the system would reposition the displays to minimize the misalignment and/or distortion.

2b. Input for adaptive HMD. A HMD can have adaptive components that change the optical or pictorial properties of the displays to minimize distortions. Interocular flash procedure could be used as input for such a procedure, as shown in FIG. 5d. The user would perform in the flash task after which the system would produce "counter distortions" to minimize distortions in the display. As shown in FIG. 5d, if the interocular apparent movement is sequentially measured in a number of different positions, the distortion present in the HMD can be detected.

Experimental Results

An experiment has been conducted to measure the effectiveness of the method. In the experiment a subject viewed interocularly flashing lines with Olympus EyeTrek FMD-700 virtual glasses. The glasses were modified so that the vertical position of displays could be changed. The subject viewed the flashing lines and moved the line in one eye to minimize the apparent movement as described earlier in this report. The number of steps required to minimize the movement was recorded.

Figure 6A:
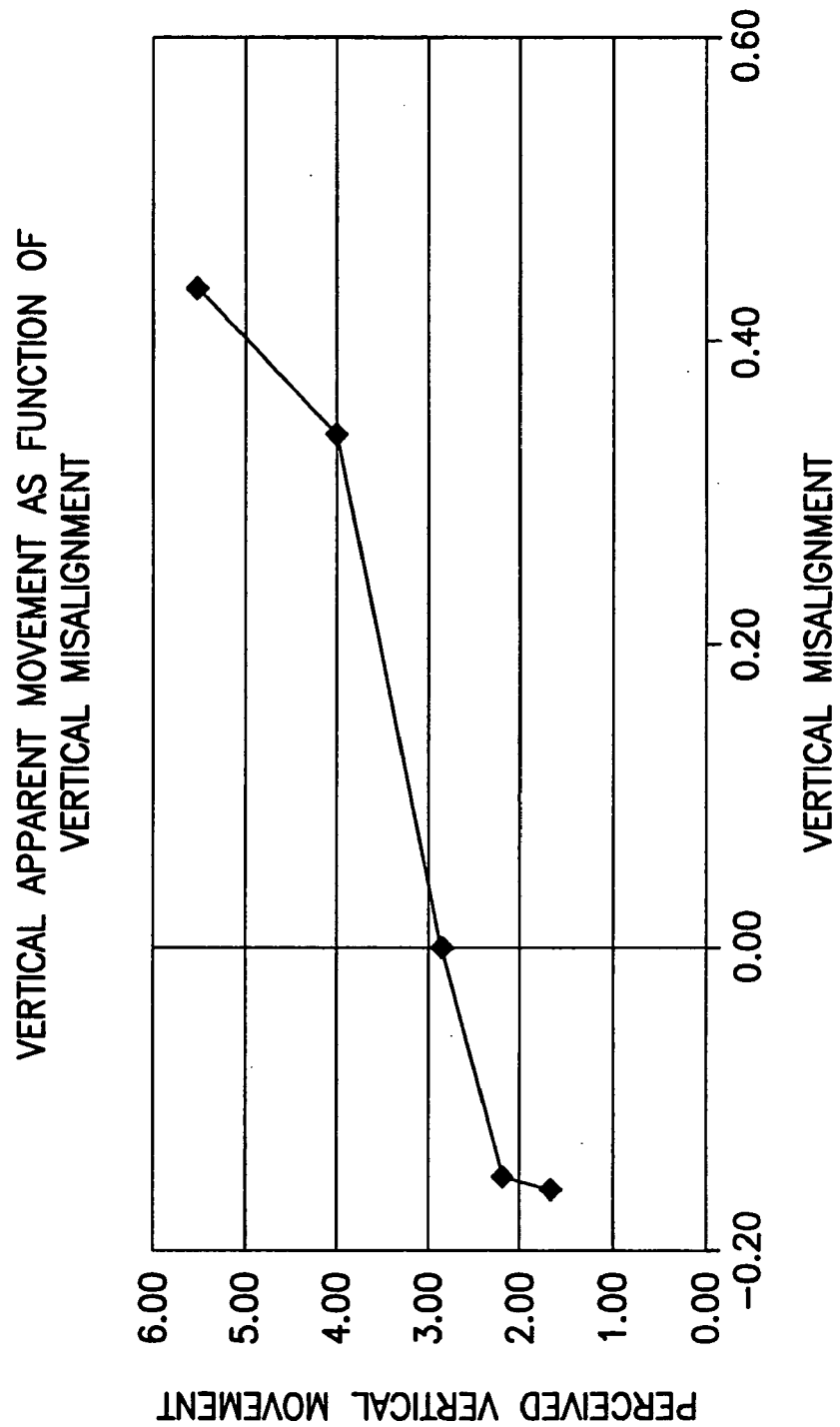
FIG. 6a is a chart showing vertical apparent movement as a function of vertical misalignment.
Figure 6B:
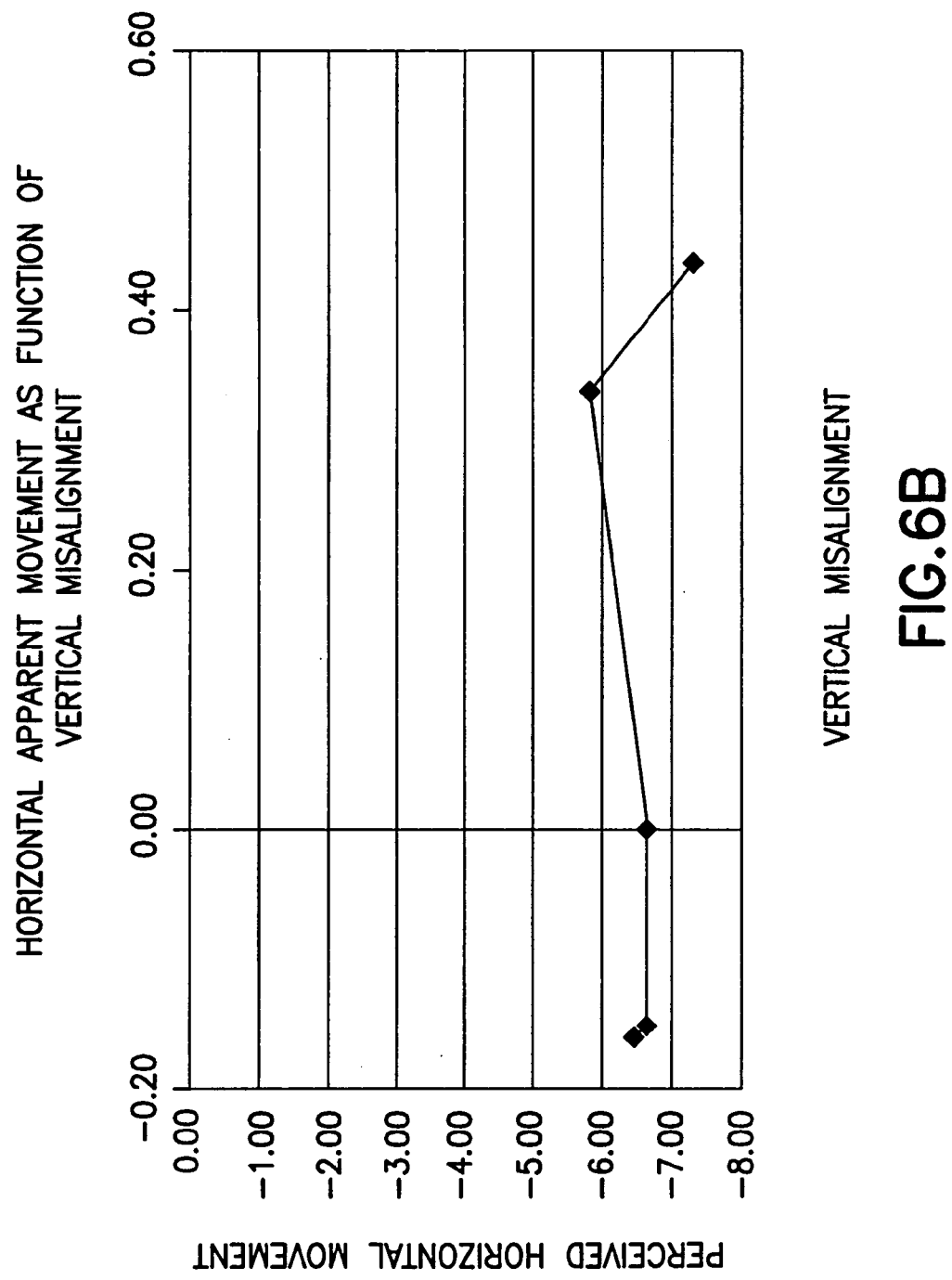
FIG. 6b is a chart showing horizontal apparent movement as a function of vertical misalignment.

The results are described in FIGS. 6a and 6b. FIG. 6a shows the magnitude of vertical apparent movement as a function of the vertical position difference in the display. The result shows that the magnitude of vertical apparent movement increased as a function of the vertical misalignment. FIG. 6b shows the magnitude of horizontal apparent movement as a function of vertical position differences. There is no clear trend in the results, so it seems that horizontal apparent movement did not change when the vertical position of the displays was changed. The result indicates that interocular apparent movement can be used to detect the direction and magnitude of display misalignment.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for aligning a binocular device having a first display and a second display to display an image, the device allowing a user to see the image on the first display with the user's left eye and the image on the second display with the user's right eye, said method comprising:

alternately providing a flashing dot at a position in the first display and a corresponding position in the second display at predetermined intervals for producing a first image of the dot in the user's left eye and a second image of the dot in the user's right eye; and adjusting at least one of the displays relative to the user's eyes until the first image and the second image appear to substantially coincide with each other.

2. The method of claim 1, wherein the adjusting is carried out by the user using a movement device.

3. The method of claim 1, wherein the adjusting is carried out by a software program.

4. The method of claim 1, wherein the adjusting is carried out by a hardware component operatively connected to the binocular device.

5. A system for aligning a binocular device having a first display and a second display to display an image, the device allowing a user to see the image on the first display with the user's left eye and the image on the second display with the user's right eye, said system comprising:

means for alternately providing a flashing dot at a position in the first display and a corresponding position in the second display at a predetermined interval to produce a first image of the dot in the user's left eye and a second image of the dot in the user's right eye; and means, operatively connected to at least one of the displays, for adjusting said at least one of the displays relative to the user's eyes until the first image and the second image appear to coincide with each other.

6. The system of claim 5, wherein the adjusting means is controllable by the user.

7. The system of claim 6, wherein the adjusting means is controllable by a software program.

8. A binocular head-mounted device having a first display and a second display, wherein the head-mounted device is configured to provide a flashing dot at a position in the first display and a corresponding position in the second display at a predetermined interval, said display comprising:

a component for adjusting at least one of the displays so that the flashing dot in the first display perceived in one of a user's eyes and the flashing dot in the second display perceived in another of the user's eyes appear to be substantially coincident.

\* \* \* \* \*